Feb. 16, 1965 A. KERNICK 3,170,133

ELECTRICAL INDUCTIVE APPARATUS

Filed Jan. 5, 1961 2 Sheets-Sheet 1

WITNESSES:
Bernard R. Gieguey
James T. Young

INVENTOR
Andress Kernick
BY
Clement L. McHale
ATTORNEY

United States Patent Office 3,170,133
Patented Feb. 16, 1965

3,170,133
ELECTRICAL INDUCTIVE APPARATUS
Andress Kernick, Lima, Ohio, assignor to Westinghouse Electric Corporation, East Pittsburgh, Pa., a corporation of Pennsylvania
Filed Jan. 5, 1961, Ser. No. 80,894
9 Claims. (Cl. 336—165)

This invention relates to electrical inductive apparatus, such as transformers, and more particularly to magnetic core structures for such apparatus.

In electric power translation systems adapted for connection between a unidirectional or direct-current power system and an alternating current power system, such as certain types of inverter circuits or rectifier systems, a transformer is often employed which includes a magnetic core that is subjected to a unidirectional component of exciting current even though the total exciting current periodically reverses during the operation of the overall translation system. If permitted to do so, the latter unidirectional component of exciting current may gradually drive the magnetic core of the transformer to saturation in a particular direction. The saturation of the magnetic core of the transformer in a translation system of the type described is undesirable since such saturation may result in damage to the components associated with the transformer in the translation system or the saturation may interfere with the desired operation of the translation system. In order to overcome the latter problem, a conventional transformer construction which has been employed in circuits of the above type includes a magnetic core structure having one or more air gaps therein which greatly increases the magnitude of exciting current required to saturate the magnetic core in either direction. A conventional transformer construction of the latter type has several important disadvantages which relate to the increased core and copper losses which result from such a construction and to the reduced efficiency of the overall translation system which includes such a transformer. It is therefore desirable to provide an improved transformer construction for use in translation systems of the type described which will overcome the saturation problem previously mentioned and which will also provide reduced losses and increased efficiency in an overall translation system.

It is an object of this invention to provide a new and improved transformer means for electric power translation systems.

Another object of this invention is to provide new and improved magnetic core structure for use in electrical inductive apparatus, such as transformers.

A further object of this invention is to provide means for improving the efficiency of electric power translation systems.

A still further object of this invention is to provide means for limiting the current during certain operating conditions of an electric power translation system.

Other objects of the invention will, in part, be obvious and will, in part, appear hereinafter.

For a fuller understanding of the nature and objects of the invention, reference should be had to the following detailed description, taken in connection with the accompanying drawings in which.

Figure 1:
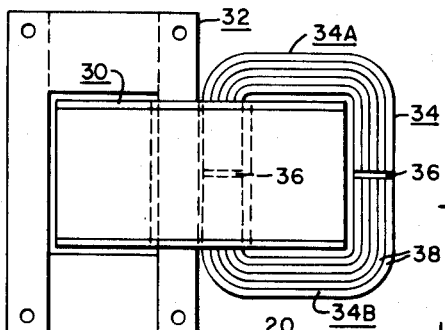
FIGURE 1 is a diagrammatic view of a transformer core and coil assembly illustrating a first embodiment of the teachings of the invention.
Figure 3:
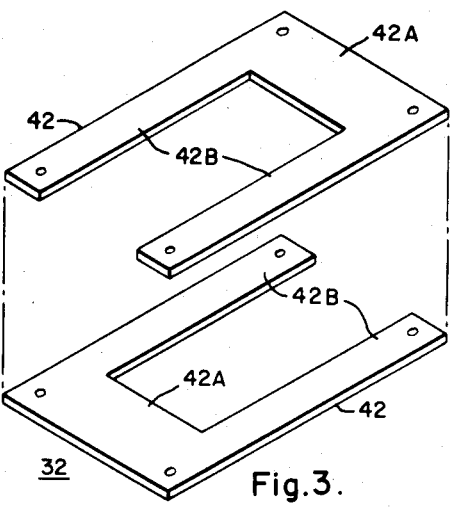
FIG. 3 is a partial exploded perspective view illustrating the manner in which the laminations may be stacked to form a portion of the magnetic core structure included in the transformer core and coil assembly shown in FIG. 1.

Referring now to the drawings and FIGS. 1 and 3, in particular, there is illustrated a transformer core and coil assembly 20 embodying the teachings of the invention. The core and coil assembly 20 comprises a magnetic core structure which includes the first and second magnetic core sections or loops 32 and 34, respectively, and a plurality of electrical windings or coils 30 which are inductively disposed on said magnetic core structure. It is to be understood that in a particular application the windings 30 may comprise separate primary and secondary windings or the windings or coils 30 may be provided in the form of a single winding where the core and coil assembly 20 is to be employed in an auottransformer.

More specifically, the magnetic core section or portion 32 in this instance comprises a plurality of layers of laminations 42 which are formed from magnetic sheet or strip material and which are assembled or stacked around a substantially rectangular window to form a substantially rectangular core section. As best shown in FIG. 3, each of the laminations 42 is generally U-shaped or C-shaped and includes a yoke or bight portion 42A and two leg portions 42B. The laminations 42 are alternately reversed during stacking with the yoke portions 42A of successive laminations being disposed at opposite ends of the magnetic core sections 32 to bridge or lap the open ends of the adjacent laminations across the leg portions 42B thereof. The latter arrangement effectively reduces the reluctance of the magnetic core section 32. In order to limit the magnetic flux density in the yoke portions 42A of the laminations 42 to substantially the same magnitude as in the leg portions 42B of said laminations, the width of each of said yoke portions is substantially twice the width of said leg portions.

The magnetic sheet or strip material from which the laminations 42 are formed is preferably one having a first favorable direction of orientation or easier magnetization substantially parallel to the edges of said material or substantially parallel to the longitudinal dimension of said material and a second favorable direction of orientation substantially at right angles to said first direction of orientation in order that the magnetic flux which travels between the different portions of the magnetic core section 32 need not travel across or crosswise with respect to the only favorable direction of orientation of the magnetic material from which the laminations 42 are formed. Examples of suitable magnetic materials include the high permeability nickel-iron alloys whose composition includes at least 40 to 50% nickel, such as those known in the art as Hipernik V. Orthonik and Deltamax or the very high permeability cobalt-iron alloys whose composition includes at least 27 to 49% cobalt, such as those known to the art as Hiperco, Permendur and Supermendur. The laminations 42 may also be formed from other suitable types of doubly oriented magnetic material, such as sheets of silicon-iron and aluminum-iron alloys containing from 1% to 7% silicon and from 1% to 10% aluminum. An example of a doubly oriented cube-textured silicon-iron alloy of the latter type is that disclosed in copending application Serial No. 681,333, filed August 30, 1957, now abandoned, and in copending application Serial No. 19,440, filed April 21, 1960, now United States Patent 2,992,951, issued July 18, 1961, which are both assigned to the same assignee as the present application. It is to be noted that the magnetic material from which the laminations 42 are formed would have a relatively low coercive force associated therewith in order to reduce the core losses in the magnetic core section 32 during the operation of the transformer core and coil assembly 20. The latter coercive force would preferably be less than 0.3 to 0.5 oersted at the normal operating frequency of the current which flows in the windings 30, as indicated at 118 in FIG. 2, for the hysteresis loop 116–118–120 which is a typical substantially rectangular hysteresis loop for the magnetic materials mentioned above.

Referring again to FIG. 1, the second magnetic core section or loop 34 is illustrated as being of the type known to the art as a type "C" core. The magnetic core section 34 may be formed, as is well known in the art, by winding a plurality of turns of the magnetic strip material 38 around a mandrel and then cutting the core in two to form the first and second magnetic core portions 34A and 34B, respectively, which are generally C-shaped or U-shaped in configuration. The magnetic core portions 34A and 34B are assembled with the gaps 36 therebetween to form with the first magnetic core section 32 an overall magnetic core structure of the shell-form type. A suitable non-magnetic material, such as air, is disposed in the gaps 36 to greatly increase the magnitude of the exciting current in the windings 30 required to saturate the magnetic core section 34. The magnetic sheet or strip material from which the second magnetic core section 34 is formed is preferably one having a favorable direction of orientation or easier magnetization substantially parallel to the longitudinal dimension of said strip material or substantially parallel to the edges of said strip material, such as cold-rolled silicon steel. It is to be noted that the windings 30 include a plurality of conductor turns which pass through the window or opening in each of the first and second magnetic core sections 32 and 34, respectively, so that when current flows in the windings 30, magnetic flux is produced in both of said magnetic core sections. It is also to be noted that due to the presence of the gaps 36 in the second magnetic core section 34 that the effective coercive force of said core section is at least several times that associated with the first magnetic core section 32, which does not include gaps of non-magnetic material, as indicated in FIG. 2 at 113 for the hysteresis loop 123 which is a typical hysteresis loop which would apply if both the first and second magnetic core sections 32 and 34, respectively, were the same as the core section 34.

Figure 2:
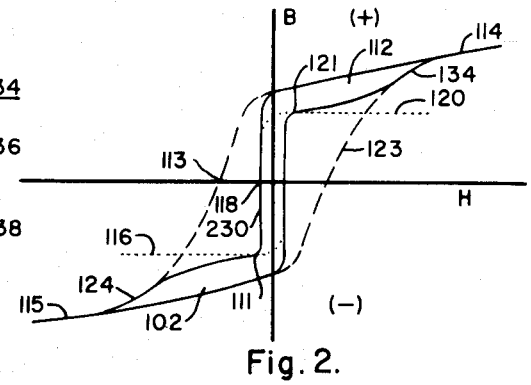
FIG. 2 is a graphical representation of a composite hysteresis loop associated with the magnetic core structure included in the transformer core and coil assembly shown in FIG. 1.

Referring now to FIG. 2, the operation of the transformer core and coil assembly 20 shown in FIG. 1 may be more easily understood by considering the composite or effective hysteresis loop for the magnetic core structure of the transformer core and coil assembly 20 which includes both the first and second magnetic core sections 32 and 34, respectively, and is the generally S-shaped loop enclosed by the solid line. The upper and lower end portions of the combined or composite hysteresis loop of the magnetic core structure of the core and coil assembly 20, as indicated at 112 and 102, respectively, result from the hysteresis loop associated with the second magnetic core section 34 as indicated at 124 and 134 and greatly increase the exciting current in the windings 30 required to saturate the magnetic core structure of the core and coil assembly 20 in either direction, as indicated at 114 and 115 for positive and negative saturation, respectively. The central portion or wasp-waist 230 of the combined or composite hysteresis loop of the magnetic core structure of the core and coil assembly 20 is determined by the hysteresis loop associated with the first magnetic core section 32, as indicated at 116–118–120. It is to be noted that the combined or composite hysteresis loop of the magnetic core structure of the core and coil assembly 20 is graphically represented in a conventional manner with the total flux density "B" of said magnetic core structure being plotted as a function of the applied magnetizing force or ampere-turns "H" produced by current flow in the windings 30.

As the exciting current which flows in the windings 30 of the transformer core and coil assembly 20 gradually increases initially, the magnetic flux produced thereby in the magnetic core structure of said core and coil assembly increases sharply or abruptly to a predetermined value in either direction, as indicated at 111 and 121, respectively, in FIG. 2, and as determined by the saturating characteristics of the first magnetic core section 32. If the exciting current is increased to a higher value in either direction, the magnetic flux produced thereby increases to a second predetermined value in either direction, as indicated at 114 and 115, respectively, and as determined by the saturating characteristics of the second magnetic core section 34. The magnitude or value of the exciting current required to saturate the magnetic core structure of the core and coil assembly 20 ultimately is many times the value required to saturate the first magnetic core section 32, as shown in FIG. 2. In other words, as the exciting current which flows in the windings 30 increases initially, the first magnetic core section 32 provides a low reluctance path for the magnetic flux produced thereby until the exciting current exceeds a value necessary to saturate the first magnetic core section 32. Prior to the saturation of the first magnetic core section 32, the magnetic flux carried by the second magnetic core section 34 is substantially negligible since the effective reluctance of the magnetic core section 34 is much greater than that of the first magnetic core section 32. After the value of the exciting current is increased to a value greater than that necessary to saturate the first magnetic core section 32 in either direction, the magnetic flux in the second magnetic core section 34 gradually increases until the value of the exciting current is sufficient to ultimately saturate the second magnetic core section 34.

It is important to note that the losses in the magnetic core structure of the core and coil assembly 20 vary with the area enclosed in the associated composite hysteresis loop, as shown in FIG. 2, during the operation of said core and coil assembly. If it is assumed that the exciting current which flows in the windings 30 of the core and coil assembly 20 is of a cyclically varying type and of an alternating polarity or periodically reversing character, then the losses in the magnetic core structure of said core and coil assembly will be reduced as long as the exciting current lies in a range of values in either direction which is just sufficient to saturate the first magnetic core section 32, as indicated at 111 and 121 in FIG. 2, and the narrowed central portion of the composite hysteresis loop of the magnetic core structure of the core and coil assembly 20 will result in lower core losses than if both the magnetic core sections of said magnetic core structure were the same as the second magnetic core section 34, which includes the gaps 36. In other words, during the assumed operating condition the apparent watts, or apparent volt-amperes which is a product of the exciting current times the voltage applied to the windings 30, as well as the corresponding true watts loss in the core and coil assembly 20, will be reduced by the presence of the first magnetic core section 32 whose associated hysteresis loop determines the narrowed central portion of the composite hysteresis loop of the magnetic core structure of said core and coil assembly.

Figure 6:
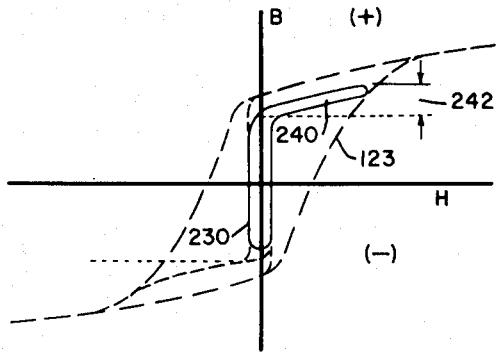
FIG. 6 is a graphical representation of a composite hysteresis loop associated with the magnetic core structure of the transformer core and coil assemblies shown in FIGS. 1, 4 and 5 during a particular operating condition.

On the other hand, if an exciting potential of a cyclically varying type which is also alternating in polarity or of a periodically reversing type is applied to the windings 30 and the latter exciting potential is unbalanced with respect to volt-seconds in one direction or the other during the different half cycles thereof, the hysteresis loop shown in FIG. 6 illustrates the type of operation that may result. If the unbalance with respect to the volt-seconds during the alternate half cycles of the exciting potential applied to the windings 30 of the core and coil assembly 20 is such as to drive the magnetic core structure 32 of said core and coil assembly towards positive saturation to a higher flux density which is greater than the saturation flux density of the magnetic core section 32 alone by an amount indicated at 242, then the exciting current required to magnetize the second magnetic core section 34 towards positive saturation will increase to thereby increase the area enclosed to the right of the vertical axis of the composite hysteresis loop, shown in FIG. 6, in a positive direction as indicated by the portion of the hysteresis loop at 240. The central portion of the hysteresis loop as indicated at 230 and as determined by the characteristics of the first magnetic core section 32 will remain essentially unchanged so that the increase in true watts of loss in the core and coil assembly 20 will be held to a minimum. The apparent watts or apparent volt-amperes will therefore increase in only one direction when an unbalanced condition exists during alternate half cycles of the exciting potential applied to the windings 30. The increase in the exciting current in the positive direction as indicated by the portion of the composite hysteresis loop at 240 will also result in a greater voltage drop across the effective resistance of the windings 30 and substantially compensate for the unbalance which exists in the exciting potential applied to the windings 30 during the assumed operating condition. If the magnetic core structure of the core and coil assembly 20 did not include the second magnetic core section 34, as just discussed, any unbalance in the exciting current, as just assumed, would gradually result in the saturation of any ungapped magnetic core sections present, such as the magnetic core section 32, and dangerous or undesirable surges or spikes of current would then be applied to the components associated with the core and coil assembly 20 in an electric power translation system.

It is to be understood that in a particular application, the first magnetic core section 32 could be constructed similarly to the second magnetic core section 34 and from a suitable magnetic material, such as the 49% cobalt iron alloy Supermendur, in a toroidal or ring-form and that in the latter construction the toroidal section 34 would include at least one gap serving the function of the gaps 36 in order to greatly increase the coercive force of the latter core section to a relatively high value similarly to the second magnetic core section 34 of FIG. 1.

Figure 4:
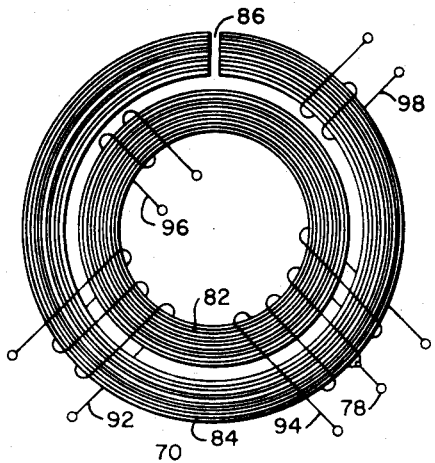
FIG. 4 is a diagrammatic view of a transformer core and coil assembly illustrating a second embodiment of the invention.

Referring now to FIG. 4, there is shown a core and coil assembly 70 illustrating a second embodiment of the invention. The core and coil assembly 70 comprises a magnetic core structure which includes the first and second magnetic core sections or loops 82 and 84, respectively, and the first and second electrical windings 92 and 94, respectively, which are inductively disposed on said magnetic core sections. Each of the windings 92 and 94 includes a plurality of conductor turns, similarly to the windings 30, and the winding 94 may include a center tap connection as indicated at 78.

More specifically, the second magnetic core section or portion 84 is illustrated as being of the toroidal or ring type and includes a plurality of turns of magnetic sheet or strip material which is wound about a substantially circular mandrel and then cut to form the gap 86 in which is disposed a non-magnetic substance or material, such as air, similarly to the second magnetic core section 34 of the core and coil assembly 20, as shown in FIG. 1. The magnetic material from which the second magnetic core section 84 is formed is preferably one having a more favorable direction of orientation or easier magnetization substantially parallel to the longitudinal dimension or the edges of said material, such as cold-rolled silicon steel, similarly to the second magnetic core section 34 of the core and coil assembly 20, previously described. The first magnetic core section 82 may be formed similarly to the second magnetic core section 84 by winding a plurality of turns of magnetic sheet or strip material on a substantially circular mandrel, except that the toroidal or ring type magnetic core section 82 is not subsequently cut to form an air gap therein as is the second magnetic core section 84. The first magnetic core section 82 is preferably formed from a magnetic sheet or strip material having a relatively low coercive force, such as the magnetic materials previously mentioned in connection with the first magnetic core section 32 of the core and coil assembly 20. In certain applications, the first magnetic core section 82 may also be formed from the same magnetic sheet or strip material, as just described, for the second magnetic core section 84 since the direction of magnetization of the first magnetic core section 82 in this instance would substantially coincide with the favorable direction of orientation of magnetic strip material whose direction of easier magnetization is substantially parallel to its longitudinal dimension or substantially parallel to its edges. Because of the gap 86 in the second magnetic core section, the effective coercive force of the second magnetic core section 84 would be at least several times that of the first magnetic core section 82 similarly to the magnetic core structure of the core and coil assembly 20, previously described. The first magnetic core section 82 is disposed in substantially concentric or nested relationship with the second mangetic core section 84 and preferably is disposed inside said second magnetic core section since the magnetic flux produced by current flow in the windings 92 and 94, particularly for lower exciting currents, would tend to concentrate in the inner magnetic core section due to the greater magnetizing force per unit length. It is to be noted that the first and second magnetic core sections 82 and 84, respectively, taken together, form a magnetic core structure of the core-form type in the core and coil assembly 70 having a central opening or window therein.

The conductor turns of both the first and second windings 92 and 94, respectively, are wound around the cross-section of both the first and second magnetic core sections 82 and 84, respectively, passing through the central opening thereof, as shown in FIG. 4, so that when current flows in said windings, magnetic flux is produced in both of said magnetic core sections.

The operation of the transformer core and coil assembly 70 is similar to the operation of the transformer core and coil assembly 20, previously described. The composite or combined hysteresis loop of the magnetic core structure of the core and coil assembly 70 is the same as that of the magnetic core structure of core and coil assembly 20, as shown in FIG. 2. The central portion of the composite hysteresis loop, shown in FIG. 2, would be determined in the case of the core and coil assembly 70 by the characteristics of the inner ungapped magnetic core section 82 for lower values of exciting current while the outer gapped magnetic core section 84 would determine the upper and lower end portions of the composite hysteresis loop shown in FIG. 2. Briefly, for lower values of exciting current in the windings 92 and 94, the magnetic flux produced thereby would tend to concentrate in the inner magnetic core section 82 which would saturate at predetermined values of exciting current above which the additional magnetic flux would concentrate in the outer magnetic core section 84 as previously discussed in connection with the core and coil assembly 20. The inner magnetic core section 82 will therefore function to limit the losses in the magnetic core structure of the core and coil assembly 70 for a lower range of exciting currents by providing a low reluctance path for the magnetic flux produced by current flow in the windings 92 and 94, while the outer magnetic core section 84 would prevent any gradual saturation of the magnetic core structure of the core and coil assembly 70 due to any unbalance which exists during alternate half cycles of the exciting potential applied to said windings. The latter saturation due to a unidirectional component of exciting current is referred to in the art as "ratcheting up," "triggering" or "walking-up."

It is to be noted that the first and second windings 92 and 94, respectively, of the core and coil assembly 70 are disposed in spaced relationship around the periphery of the magnetic core sections 82 and 84. It is to be understood, however, that the conductor turns of the second winding 94 may be wound over or in concentric relationship with the conductor turns of the first winding 92 in a particular application to increase the effective resistance of said second winding and decrease the compensating requirements in the magnetic core structure of the core and coil assembly 70, as discussed in connection with the core and coil assembly 20.

The additional windings 96 and 98 may be provided on the magnetic core sections 82 and 84, respectively, in certain applications for testing purposes to determine the magnetic characteristics of the different core sections. These additional windings would then be employed with any suitable type of hysteresis loop tracing equipment to trace the different areas included in the composite hysteresis loop shown in FIG. 2 due to the core sections 82 and 84. It should be noted that the output of the winding 96 could be employed as a constant volt-second output signal as long as the exciting potential provides sufficient volt-seconds to saturate the magnetic core section 82 sufficient to saturate the latter core section.

Figure 5:
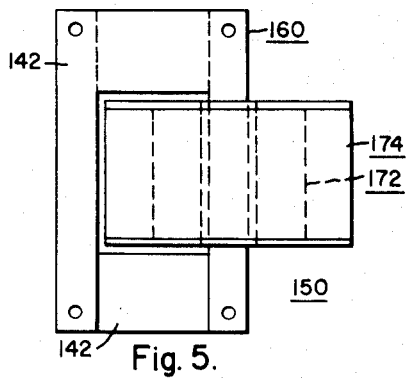
FIG. 5 is a front elevational view of a transformer core and coil assembly illustrating a third embodiment of the invention.
Figure 7:
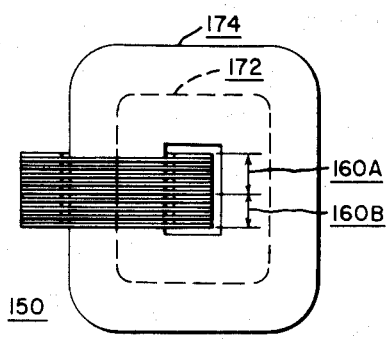
FIG. 7 is a top plan view of the transformer core and coil assembly shown in FIG. 5.

Referring to FIGS. 5 and 7, there is shown a core and coil assembly 150 illustrating a third embodiment of the invention. The core and coil assembly 150 comprises a magnetic core structure which includes the first and second magnetic core sections or loops 160A and 160B, respectively, and the first and second windings 172 and 174, respectively, which are inductively disposed on said magnetic core structure.

The overall configuration of each of the magnetic core sections 160A and 160B is the same with each of said magnetic core sections comprising a plurality of assembled or stacked layers of laminations 142 which are assembled around a substantially rectangular window to form a substantially rectangular magnetic core section or loop similarly to the core and coil assembly 20, previously described. The first and second magnetic core sections 160A and 160B, respectively, however, are disposed adjacent to one another along a common axis to form a magnetic core of the core-form type. The magnetic sheet or strip material from which the laminations 142 of the second magnetic core section 160B are formed is the same as the magnetic material from which the second magnetic core section 34 is formed having a more favorable direction of orientation or easier magnetization substantially parallel to its longitudinal dimension or substantially parallel to its edges. The magnetic material from which the first magnetic core section or loop 160A is formed is the same as the magnetic materials previously described in connection with the first magnetic core section 32 of the core and coil assembly 20 having a first favorable direction of orientation or easier magnetization substantially parallel to the longitudinal dimension or substantially parallel to the edges of said strip material and a second favorable direction of orientation at substantially right angles to said first direction of orientation. Due to the type of magnetic material employed in the first magnetic core section 160A, the effective coercive force of the first magnetic core section will be relatively low since the magnetic flux produced by current flow in the windings 172 and 174 need not travel crosswise of a single favorable direction of orientation of the magnetic material from which said core section is formed. On the other hand, the singly oriented magnetic material from which the second magnetic core section 160B is formed will result in the magnetic flux produced by current flow in the windings 172 and 174 traveling crosswise or against the single favorable orientation of said strip material and the effect of a gap will be produced in the second magnetic core section 160B to increase the effective coercive force of said second magnetic core section to a value at least several times that of the first magnetic core section 160A. It is to be noted that the conductor turns of each of the windings 172 and 174 pass through the central opening or window of the overall magnetic core structure of the core and coil assembly 150 with the conductor turns of the winding 172 being disposed inside the conductor turns of the winding 174 so that the effective length of the conductor turns of the winding 174 is increased to thereby increase the effective resistance of the winding 174 over that of the winding 172. The latter arrangement may have certain advantages in applying the core and coil assembly 150 since the greater effective resistance of the winding 174 may be employed to reduce the required compensating effect of the magnetic core structure of the core and coil assembly 150 during operation of the core and coil assembly 150 when the exciting potential is unbalanced during the different half cycles thereof as previously discussed in connection with the core and coil assembly 20.

The operation of the core and coil assembly 150 is similar to that previously described in detail for the core and coil assembly 20. For lower values of exciting current, the magnetic flux produced thereby tends to concentrate in the first magnetic core section 160A which saturates at predetermined values of exciting current in either direction. For greater values of exciting current, the additional magnetic flux produced thereby tends to concentrate in the second magnetic core section 160B as indicated by the combined or composite hysteresis loop shown in FIG. 2 which also applies to the magnetic core structure of the core and coil assembly 150.

Figure 8:
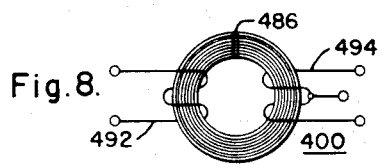
FIG. 8 is a top plan view of a transformer core and coil assembly similar to that shown in FIGS. 5 and 7.
Figure 9:
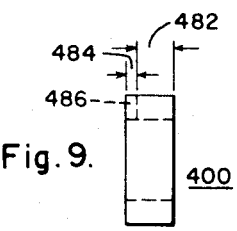
FIG. 9 is an elevational view of the transformer core and coil assembly shown in FIG. 8.

Referring to FIGS. 8 and 9, there is illustrated a core and coil assembly 400 similar to the core and coil assembly shown in FIGS. 5 and 7 except that the first and second core sections 482 and 484 respectively, included in the core and coil assembly 400 are of the toroidal or ring type rather than being of the stacked type. In particular, the core section 482 would be similar to the core section 82 previously described in detail. The core section 484 would be similar to the core section 84 previously described except that the diameter of the core sections 482 and 484 may be substantially equal since the latter core sections are disposed adjacent to one another along a common axis. The gap 486 included in the core section 484 would preferably be between 0.004 and 0.010 inch. The windings 492 and 494 may be arranged similarly to the windings 92 and 94 of the core and coil assembly 70 shown in FIG. 4 to pass through the openings in both of the core sections 482 and 484. Additional windings for testing or other purposes may be added to the core and coil assembly 400 which would individually pass around only one of the core sections 482 and 484.

Figure 12:
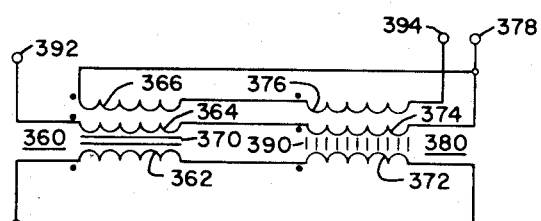
FIG. 12 is a schematic diagram of a transformer means illustrating a final embodiment of the teachings of the invention.

Referring to FIG. 12 there is shown a final embodiment of the invention in which the first and second separate transformers 360 and 380, respectively, are employed. The first transformer 360 comprises a magnetic core structure 370 and the first, second and third windings 362, 364 and 366, respectively, which are inductively disposed thereon. The magnetic core structure 370 would be similar to the first magnetic core section 32 of the core and coil assembly 20, previously described. The second transformer 380 comprises a magnetic core structure 390 and the first, second and third windings 372, 374 and 376, respectively, which are inductively disposed thereon. The magnetic core structure 390 would be similar to the magnetic core section 34 of the transformer core and coil assembly 20, previously described. In other words, the effective coercive force associated with the magnetic core structure 370 would be relatively low and the operating losses for a lower range of exciting currents would also be relatively low, while the effective coercive force of the magnetic core structure 390 of the second transformer 380 would be at least several times that of the magnetic core structure 370 in order to compensate for any unbalance in the different half cycles of the exciting potential at the terminals 392 and 394 applied across the second windings 364 and 374 of the transformers 360 and 380, respectively, which are connected in series circuit relationship and across the third windings 366 and 376 of said transformers which are also connected in series circuit relationship with one another on opposite sides of the center tap 378. The second and third windings of the transformers 360 and 380 taken together are equivalent to the winding 94 shown in FIG. 4. The first windings 362 and 372 of the transformers 360 and 380, respectively, are connected in series circuit relationship to form the equivalent of winding 92 shown in FIG. 4. In other words, the first and second transformers 360 and 380 taken together, would provide similar operating advantages to those previously described for the core and coil assemblies 20, 70 and 150, but would have the disadvantage that separate sets of windings would be required on the magnetic core structures of the separate transformers and the overall transformer means shown in FIG. 12 would therefore be less compact, less efficient, heavier in weight, and most costly to make.

Figure 10:
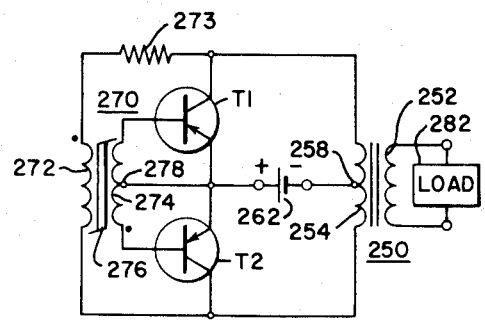
FIGS. 10 and 11 are schematic diagrams of different electric power translation systems in which the disclosed transformer construction may be advantageously employed.

Referring now to FIG. 10, there is illustrated an electric power translation system, more specifically an inverter circuit, in which the various transformer core and coil assembly constructions disclosed may be advantageously employed. In general, the inverter circuit shown in FIG. 10 is a known type which is employed to convert unidirectional or direct-current power from the source 262 to alternating current energy or power which is supplied to the load 282 through the output transformer 250. The inverter circuit shown in FIG. 10, is referred to in the art as being of the "driven" type since the frequency of the alternating current output supplied to the load 282 is determined externally of the output transformer 250 and does not depend upon the saturating characteristics of the magnetic core structure of the transformer 250, but upon a separate means, which in this case is the feedback transformer 270.

More specifically, the transformer 250, in which the core and coil assemblies 20, 70 and 150, previously described would be employed, comprises a magnetic core structure 256 and the first and second windings 254 and 252 which are inductively disposed thereon. In this instance, a pair of switching transistors T1 and T2, each having an emitter, a collector and a base is employed. The emitter-collector paths of the switching transistors T1 and T2, which are illustrated as being of the p-n-p type, are connected in series circuit relation with one another back-to-back, the series circuit being connected across the primary winding 254 of the output transformer 250. The source of unidirectional or direct-current power 262 is connected between the common terminal between the emitters of the transistors T1 and T2 and the center or mid-tap connection 258 of the primary or first winding 254 of the output transformer 250. The winding 254 may be wound on magnetic structure 256 over the winding 252 for reasons of increased effective resistance as previously discussed for the windings 94 and 174. As indicated previously the load 282 is connected across the winding 252 of the output transformer 250. In order to provide the necessary feedback to the input of the switching transistors T1 and T2, the feedback transformer 270 is connected in circuit relation between the output transformer 250 and the inputs of said switching transistors. In particular, the primary or first winding 272 of the feedback transformer 270 is connected across the primary winding 254 of the output transformer 250 through the current limiting resistor 273. The second winding 274 of the feedback transformer 270 is connected between the bases of the switching transistors T1 and T2, while the mid-tap connection 278 of the second winding 274 is connected to the emitters of both the switching transistors T1 and T2. The first and second windings 272 and 274 of the feedback transformer 270 are inductively disposed on a magnetic core structure 276 which is preferably formed of substantially rectangular-loop core material. The saturation characteristic of the magnetic core structure 276 determines the frequency of the alternating current supplied to the load 282 across the winding 252 of the output transformer 250.

The operation of the inverter circuit shown in FIG. 10 may be considered briefly by assuming that initially the transistor T1 conducts current to a slightly greater degree from the source 262 through its emitter-collector path to the primary winding 254 of the output transformer 250. A net voltage will then appear across the primary winding 254 which is positive at the upper end of the primary winding 254 with respect to the voltage at the lower end thereof. The latter net voltage will be coupled through the feedback transformer 270 to the base-emitter inputs of each of the transistors T1 and T2 tending to drive the transistor T2 towards cut-off and to drive the transistor T1 towards the conduction of saturation current until the magnetic core structure 276 of the feedback transformer 270 saturates. The length of the period of time during which the transistor T1 will conduct saturation current and the transistor T2 will remain cut-off or substantially non-conducting, depends upon the volt-seconds required to saturate the magnetic core structure 276 of the transformer 270. At the end of the latter period of time after the magnetic core structure 276 saturates, the input to the transistors T1 tending it to cause it to conduct saturation current will be removed and the current through the transistor T1 will tend to decrease, thus causing a change in the output voltage across the primary winding of the transformer 250. The latter change in the output voltage will be in such a direction as to drive the transistor T2 towards the conduction of saturation current and the transistor T1 towards cut-off or a non-conducting state to complete one cycle of operation in the alternating current supplied to the load 282. It is important to note that in the operation of the inverter circuit, just described, if the impedance characteristics of the transistors T1 and T2 are not substantially equal or exactly matched, then a net unidirectional component of exciting current or magnetizing force will be applied to the magnetic core structure 256 of the output transformer 250 which will gradually drive the magnetic core structure 256 towards saturation in a particular direction. If the magnetic core structure 256 of the transformer 250 should saturate because of such an applied unidirectional component of exciting current, then the normal operation of the inverter circuit, shown in FIG. 8, would be at least interferred with and possibly the increased dissipation in one or both of the switching transistors T1 and T2 would cause damage to said components. On the other hand, if the transformer 250 were constructed in accordance with the teachings of the invention, the magnetic core structure 256 would require a greater exciting current in such a direction as to compensate for the unbalanced voltage drops due to the differences in the impedance characteristics of the switching transistors T1 and T2 to prevent any interference with the operation of the inverter circuit or any damage to the components thereof while still limiting the losses in said magnetic core structure to improve the efficiency of said inverter circuit.

It should also be noted that unbalance in the exciting potential applied to the magnetic core structure 256 of the transformer 250 with respect to the volt-seconds during the different half cycles in the alternating current supplied to the load 282 may also result if the primary winding 254 of the transformer 250 is not balanced with respect to the mid-tapped connection 258 in that one portion of said winding may include a different number of turns than the other portion thereof. In addition, unbalance in the exciting potential applied to the transformer core structure 256 with respect to the volt-seconds during the different half cycles of the alternating current output may result from variations or modulation of the unidirectional or direct current voltage supplied from the source 262 to the inverter circuit, shown in FIG. 10, or from any voltage surges from the source 262 which are applied to said inverter circuit. Another possible cause of unbalance in the exciting potential applied to the magnetic core structure 256 of the transformer 250 with respect to volt-seconds during different half cycles of the alternating current output may result from any uneven time division during the different half cycles of the alternating current supplied to the load 282 which may be caused by the special nature of a particular load or frequency source and which may even be repetitive or cyclic in character. As mentioned previously, if the transformer 250 is constructed in accordance with the teachings of the invention, the increased exciting current required by the magnetic core structure 256 during certain half cycles of the alternating current output supplied to the load 282 results in an increased voltage drop across the effective resistance of the primary winding 254 of the transformer 250 and thus compensates for any unbalance with respect to volt-seconds during the different half cycles of the exciting potential applied to the magnetic core structure 256 to thereby prevent any gradual saturation of said magnetic core structure.

Figure 11:
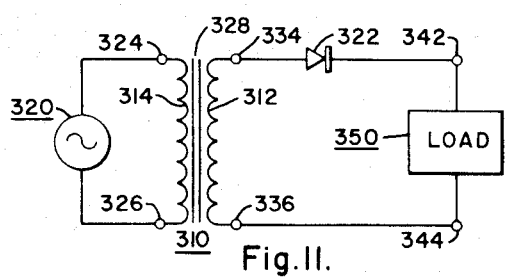

Referring now to FIG. 11, there is illustrated another example of an electric power translation system, more specifically, a half-wave rectifier circuit, in which the transformer included may be advantageously constructed in accordance with the teachings of the invention. As is well known in the art, the rectifier circuit shown in FIG. 11 includes a source of alternating current 320 which is connected across the primary or first winding 314 of the transformer 310 at the terminals 324 and 326. The second winding of the transformer 310 applies the alternating current voltage at the terminals 334 and 336 to the load 350 at the terminals 342 and 344 through the rectifying device 322 which may be any conventional type of rectifying device, such as a semiconductor diode or other asymmetrically-conducting device. Since the rectifying device 322 permits load current flow to the load 350 from the source 320 through the transformer 310 during alternate half cycles, the magnetizing force applied to the magnetic core structure 328 of the transformer 310, on which the windings 312 and 314 are inductively disposed, is not balanced or symmetrical during the different half cycles of current which flows to the load 350. The transformer 310 and its magnetic core structure 328 may therefore be constructed in accordance with the teachings of the invention to compensate for the unbalance which exists during the different half cycles of the current which flows to the load 350 to thus prevent a gradual saturation of the magnetic core structure 328 due to a unidirectional component of volt-seconds, which would otherwise be present.

In summary, it is important to note that the transformer construction disclosed may be employed in electric power translation systems to achieve lower core and coil losses and thus greater efficiency, while still preventing any gradual saturation of the magnetic core structure included in said transformer due to the various operating conditions previously discussed. In other words, the normal operating losses of a transformer disclosed are reduced for a normal range of exciting currents applied thereto while the components associated with said transformer in an electric power translation system such as an inverter circuit or rectifier circuit are protected from damage thereto during any operating condition when an unbalance with respect to volt-seconds exists in the different half cycles of exciting potential applied to the magnetic core structure of the transformer.

It is to be understood that the improved transformer construction disclosed may be employed in other types of electric power translation systems such as those including controlled rectifiers of the semiconductor type in which the unbalanced operating conditions previously described may make it either extremely difficult or impossible to turn off the controlled rectifiers during the operation of the electric power translation system in which they are employed.

The apparatus embodying the teachings of this invention has several advantages. For example, the core losses in a transformer employed in an electric power translation system are substantially decreased during normal operating condition when no unbalance with respect to volt seconds exists in the exciting potential applied to the magnetic core structure of the transformer. On the other hand, the magnetic core structure of the transformer cooperates with the associated windings to compensate for any unbalanced condition with respect to volt-seconds which exists between the different half cycles of the exciting potential applied to the magnetic core structure of the transformer to prevent any interference in the normal operation of the translation system or damage to the components associated with the transformer in the translation system. In addition, the transformer construction disclosed makes it unnecessary to precisely match the impedance characteristics or other characteristics of the different components included in an electric power translation system.

Since numerous changes may be made in the above described apparatus and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. A transformer comprising a magnetic core structure, and at least two windings including a plurality of conductor turns, said magnetic core structure comprising first and second magnetic core sections formed from first and second magnetic materials, respectively, the turns of said windings being linked with both of said core sections to produce magnetic flux in both of said core sections when current flows therethrough, the coercive force of said second magnetic core section being at least several times the coercive force of said first magnetic core section, with the first magnetic core section limiting the losses in said magnetic core structure and the second magnetic core structure preventing gradual saturation of said magnetic core structure.

2. A transformer comprising first and second magnetic core loops disposed adjacent to one another and formed from first and second magnetic materials, respectively, the coercive force of said second magnetic core loop being several times that of said first magnetic core loop, primary and secondary windings including a plurality of conductor turns, the turns of said windings being disposed to pass through both of said core loops and produce magnetic flux when current flows therethrough, the first magnetic core loop limiting the losses of said transformer by providing a low reluctance path for the magnetic flux, and the second magnetic core loop preventing gradual saturation of the transformer.

3. A transformer comprising first and second magnetic core loops disposed adjacent to one another and formed from first and second magnetic materials, respectively, the coercive force of said second magnetic core loop being several times that of said first magnetic core loop, said second core loop including a gap, a non-magnetic substance disposed in said gap, primary and secondary windings including a plurality of conductor turns, the turns of said windings being disposed to pass through both of said core loops and produce magnetic flux when current flows therethrough, said first magnetic core loop limiting the losses of said transformer over a predetermined range of current by providing a low reluctance path for the magnetic flux, and said second magnetic core loop preventing gradual saturation of said transformer.

4. A transformer comprising primary and secondary windings including a plurality of conductor turns, and a magnetic core structure comprising first and second magnetic core loops formed from first and second magnetic materials, respectively, the coercive force of said second core loop being at least several times that of said first core loop, said first core loop being disposed in nested relation with and inside said second core loop, the conductor turns of said windings being disposed to pass through both of said core loops and produce magnetic flux when current flows therethrough, said first core loop limiting the losses of said magnetic core structure over a predetermined range of current by providing a low reluctance path for said magnetic flux, and said second core loop preventing gradual saturation of said magnetic core structure due to any unbalance in alternate half cycles of the potential applied to said windings.

5. A transformer comprising primary and secondary windings including a plurality of conductor turns, a magnetic core comprising first and second toroidal core sections formed from first and second magnetic strip materials, respectively, the coercive force of said second core section being at least several times that of said first core section, said first core section being disposed in concentric relation with and inside said second core section, the conductor turns of said windings being disposed to pass through both of said core sections and produce magnetic flux when current flows therethrough, said first core section limiting the losses in the magnetic core over a predetermined range of current by providing a lower reluctance path for said magnetic flux than said second core section, and said second core section preventing gradual saturation of said magnetic core due to any unbalance in alternate half cycles of the potential applied to said windings.

6. A transformer comprising primary and secondary windings including a plurality of conductor turns, a magnetic core comprising first and second toroidal core sections formed from first and second magnetic strip materials, respectively, the coercive force of said second core section being at least several times that of said first core section, said first core section being disposed in concentric relation with and inside said second core section, said second core section including a gap therein, a non-magnetic substance disposed in said gap, the conductor turns of said windings being disposed to pass through both of said core sections and produce magnetic flux when current flows therethrough, said first core section limiting the losses in said magnetic core over a predetermined range of current by providing a lower reluctance path for said magnetic flux than said second core section, and said second core section preventing gradual saturation of said magnetic core due to any unbalance in alternate half cycles of the potential applied to said windings.

7. A transformer comprising primary and secondary windings including a plurality of conductor turns, a magnetic core structure comprising first and second magnetic core loops formed from first and second magnetic materials, respectively, the coercive force of said second magnetic core loop being at least several times that of said first magnetic core loop, said first and second magnetic core loops being disposed adjacent to one another along a common axis, the conductor turns of said windings being disposed to pass through said first and second magnetic core loops and produce magnetic flux when current flows therethrough, said first core loop limiting the losses in said magnetic core structure over a predetermined range of current by providing a lower reluctance path for the magnetic flux, and said second core loop preventing gradual saturation of said magnetic core structure.

8. A transformer comprising primary and secondary windings including a plurality of conductor turns, a magnetic core comprising a plurality of laminations assembled around a substantially rectangular window, said laminations being divided into first and second groups of laminations, the second group of laminations having an effective coercive force which is at least several times that of the first group of laminations, the conductor turns of said windings being disposed to pass through the window of said core and produce magnetic flux when current flows therethrough, said first group of laminations limiting the losses in said magnetic core over a predetermined range of current by providing a low reluctance path for the magnetic flux and said second group of laminations preventing gradual saturation of said magnetic core by providing a higher reluctance path for the magnetic flux when said first group of laminations reaches saturation.

9. A transformer comprising primary and secondary windings including a plurality of conductor turns, a magnetic core comprising a plurality of laminations assembled around a substantially rectangular window, said laminations being divided into first and second groups of laminations formed from first and second magnetic materials, respectively, the second group of laminations having an effective coercive force which is at least several times that of the first group of laminations, said second magnetic sheet material having a preferred direction of orientation lengthwise of said sheet material, said first magnetic sheet material having a first preferred direction of orientation lengthwise of said sheet material and a second preferred direction of orientation substantially perpendicular to said first preferred direction, the conductor turns of said windings being disposed to pass through the window of said core.

References Cited in the file of this patent

UNITED STATES PATENTS

| 1,654,097 | Shackelton | Dec. 27, 1927 |
| 1,849,485 | Gibbs | Mar. 15, 1932 |
| 1,952,072 | Jewell | Feb. 12, 1932 |
| 2,407,688 | Sclater | Sept. 17, 1946 |
| 2,927,366 | Link | Mar. 8, 1960 |
| 3,015,791 | Rolf | Jan. 2, 1962 |
| 3,076,160 | Daniels | Jan. 29, 1963 |

FOREIGN PATENTS

| 295,500 | Switzerland | Mar. 1, 1954 |
| 306,826 | Great Britain | Feb. 22, 1929 |

OTHER REFERENCES

Pub. I: Selected Semiconductor Circuits Handbook, Schwartz Editor, Wiley Publisher, TK 7872, S4, S32, sec. 9–42, circuit 9–8.